United States Patent
Walter et al.

(10) Patent No.: US 9,389,850 B2
(45) Date of Patent: Jul. 12, 2016

(54) SYSTEM AND APPROACH TO MANAGE VERSIONING OF FIELD DEVICES IN A MULTI-SITE ENTERPRISE

(71) Applicant: Honeywell International Inc., Morristown, NJ (US)

(72) Inventors: Gerald Walter, Canton, OH (US); Ripunjeet Dutta, Morristown, NJ (US)

(73) Assignee: Honeywell International Inc., Morris Plains, NJ (US)

( * ) Notice: Subject to any disclaimer, the term of this patent is extended or adjusted under 35 U.S.C. 154(b) by 245 days.

(21) Appl. No.: 13/689,551

(22) Filed: Nov. 29, 2012

(65) Prior Publication Data

US 2014/0149973 A1    May 29, 2014

(51) Int. Cl.
G06F 9/44     (2006.01)
G06F 9/445    (2006.01)

(52) U.S. Cl.
CPC . *G06F 8/71* (2013.01); *G06F 8/665* (2013.01)

(58) Field of Classification Search
None
See application file for complete search history.

(56) References Cited

U.S. PATENT DOCUMENTS

| | | | |
|---|---|---|---|
| 4,110,827 A | 8/1978 | Shavit | |
| 4,130,874 A | 12/1978 | Pai | |
| 4,153,936 A | 5/1979 | Scmitz et al. | |
| 4,419,667 A | 12/1983 | Gurr et al. | |
| 4,850,010 A | 7/1989 | Stanbury et al. | |
| 4,937,760 A | 6/1990 | Beitel et al. | |
| 5,341,142 A | 8/1994 | Reis et al. | |
| 5,500,561 A | 3/1996 | Wilhelm | |
| 5,566,084 A | 10/1996 | Cmar | |
| 5,572,438 A | 11/1996 | Ehlers et al. | |
| 5,598,349 A | 1/1997 | Elliason et al. | |
| 5,719,854 A | 2/1998 | Choudhury et al. | |
| 5,822,553 A | 10/1998 | Gifford et al. | |
| 5,892,758 A | 4/1999 | Argyroudis | |

(Continued)

FOREIGN PATENT DOCUMENTS

| | | |
|---|---|---|
| JP | 2012118982 | 6/2012 |
| WO | WO 2005/033964 | 4/2005 |

(Continued)

OTHER PUBLICATIONS

"Demand Response Measurement and Verification Literature Review," 29 pages, prior to Nov. 29, 2012.

(Continued)

*Primary Examiner* — H S Sough
*Assistant Examiner* — Deric Ortiz
(74) *Attorney, Agent, or Firm* — Seager, Tufte & Wickhem, LLP

(57) ABSTRACT

An energy management and control system that may manage versioning firmware for devices. The system may be structured in a hierarchy of enterprise, site and field levels, with one or more computing platforms at the various levels. An enterprise supervisor may detect and obtain new version firmware for the devices at the field level. The new version firmware may be transferred from the supervisor to one or more site controllers. The one or more site controllers may transfer the new version firmware to eligible field devices. The devices may report to their respective site controllers a status of a transfer of the new version hardware. The site controllers may report to the supervisor the status of the transfer. Detection of new version firmware may be automatic. Transfer of the new version firmware to virtually all of the eligible devices may be automatic.

20 Claims, 4 Drawing Sheets

(56) References Cited

U.S. PATENT DOCUMENTS

| | | | |
|---|---|---|---|
| 6,026,375 A | 2/2000 | Hall et al. |
| 6,195,367 B1 | 2/2001 | Jakobik et al. |
| 6,209,018 B1 | 3/2001 | Ben-shachar et al. |
| 6,252,950 B1 | 6/2001 | Duty et al. |
| 6,259,723 B1 | 7/2001 | Miyashita |
| 6,278,717 B1 | 8/2001 | Arsenault et al. |
| 6,289,384 B1 | 9/2001 | Whipple et al. |
| 6,366,926 B1 | 4/2002 | Pohlmann et al. |
| 6,446,136 B1 | 9/2002 | Pohlmann et al. |
| 6,519,509 B1 | 2/2003 | Nierlich et al. |
| 6,529,723 B1 | 3/2003 | Bentley |
| 6,535,817 B1 | 3/2003 | Krishnamurti et al. |
| 6,566,926 B1 | 5/2003 | Patterson |
| 6,574,581 B1 | 6/2003 | Bohrer et al. |
| 6,758,161 B2 | 7/2004 | Nohynek |
| 6,832,249 B2 | 12/2004 | Ciscon et al. |
| 6,857,022 B1 | 2/2005 | Scanlan |
| 6,865,685 B2 | 3/2005 | Hammond et al. |
| 6,985,087 B2 | 1/2006 | Soliman |
| 7,010,700 B1 | 3/2006 | Foss et al. |
| 7,016,784 B2 | 3/2006 | Allen et al. |
| 7,039,532 B2 | 5/2006 | Hunter |
| 7,069,309 B1 | 6/2006 | Dodrill et al. |
| 7,183,910 B2 | 2/2007 | Alvarez et al. |
| 7,260,616 B1 | 8/2007 | Cook |
| 7,333,880 B2 | 2/2008 | Brewster et al. |
| 7,337,237 B2 | 2/2008 | Salahshoor et al. |
| 7,346,467 B2 | 3/2008 | Bohrer et al. |
| 7,392,115 B2 | 6/2008 | Schindler |
| 7,401,086 B2 | 7/2008 | Chorafakis et al. |
| 7,472,301 B2 | 12/2008 | Ginggen et al. |
| 7,528,503 B2 | 5/2009 | Rognli et al. |
| 7,565,227 B2 | 7/2009 | Richard et al. |
| 7,590,746 B2 | 9/2009 | Slater et al. |
| 7,650,289 B2 | 1/2010 | Cooper et al. |
| 7,676,657 B2 | 3/2010 | Lindholm et al. |
| 7,702,424 B2 | 4/2010 | Cannon et al. |
| 7,715,951 B2 | 5/2010 | Forbes, Jr. et al. |
| 7,742,953 B2 | 6/2010 | King et al. |
| 7,775,191 B2 | 8/2010 | Hou |
| 7,778,738 B2 | 8/2010 | Taft |
| 7,797,009 B2 | 9/2010 | Kiiskila et al. |
| 7,806,845 B2 | 10/2010 | Arm et al. |
| 7,844,481 B2 | 11/2010 | Hilbush et al. |
| 7,845,576 B2 | 12/2010 | Siddaramanna et al. |
| 7,865,252 B2 | 1/2011 | Clayton |
| 7,873,441 B2 | 1/2011 | Synesiou et al. |
| 7,885,718 B2 | 2/2011 | Yano et al. |
| 7,886,166 B2 | 2/2011 | Shnekendorf et al. |
| 7,925,384 B2 | 4/2011 | Huizenga |
| 7,941,528 B2 | 5/2011 | Hicks, III et al. |
| 7,954,726 B2 | 6/2011 | Siddaramanna et al. |
| 7,958,229 B2 | 6/2011 | Conway |
| 8,023,410 B2 | 9/2011 | O'Neill |
| 8,073,558 B2 | 12/2011 | Koch et al. |
| 8,091,794 B2 | 1/2012 | Siddaramanna et al. |
| 8,140,279 B2 | 3/2012 | Subbloie |
| 8,140,658 B1 | 3/2012 | Gelvin et al. |
| 8,143,811 B2 | 3/2012 | Shloush et al. |
| 8,163,276 B2 | 4/2012 | Hedrick et al. |
| 8,170,774 B2 | 5/2012 | Forte et al. |
| 8,183,995 B2 | 5/2012 | Wang et al. |
| 8,199,773 B2 | 6/2012 | Aubin et al. |
| 8,232,745 B2 | 7/2012 | Chemel et al. |
| 8,234,017 B2 | 7/2012 | Ahn |
| 8,234,876 B2 | 8/2012 | Parsonnet et al. |
| 8,260,468 B2 | 9/2012 | Ippolito et al. |
| 8,260,469 B2 | 9/2012 | Gregory et al. |
| 8,260,650 B2 | 9/2012 | Miller |
| 8,291,243 B2 | 10/2012 | Castelli et al. |
| 8,295,989 B2 | 10/2012 | Rettger et al. |
| 8,305,380 B2 | 11/2012 | Gotwalt et al. |
| 8,312,299 B2 | 11/2012 | Tremel et al. |
| 8,321,302 B2 | 11/2012 | Bauer et al. |
| 8,321,950 B2 | 11/2012 | Oran |
| 8,327,024 B2 | 12/2012 | Pattison et al. |
| 8,330,762 B2 | 12/2012 | Grossman |
| 8,352,094 B2 | 1/2013 | Johnson et al. |
| 8,373,547 B2 | 2/2013 | Benya et al. |
| 8,386,086 B2 | 2/2013 | Roux et al. |
| 8,406,937 B2 | 3/2013 | Verfuerth et al. |
| 8,412,654 B2 | 4/2013 | Montalvo |
| 8,417,391 B1 | 4/2013 | Rombouts et al. |
| 8,565,903 B2 | 10/2013 | Koch et al. |
| 8,595,094 B1 | 11/2013 | Forbes, Jr. |
| 8,626,354 B2 | 1/2014 | Walter et al. |
| 8,630,744 B2 | 1/2014 | Walter et al. |
| 8,639,214 B1 | 1/2014 | Fujisaki |
| 8,676,273 B1 | 3/2014 | Fujisaki |
| 8,676,953 B2 | 3/2014 | Koch |
| 8,700,187 B2 | 4/2014 | Forbes, Jr. |
| 8,782,190 B2 | 7/2014 | Koch |
| 8,868,925 B2 | 10/2014 | Wyatt et al. |
| 8,879,488 B2 | 11/2014 | Pavlovski et al. |
| 9,183,522 B2 | 11/2015 | Koch |
| 2003/0016237 A1 | 1/2003 | Hickey |
| 2003/0033230 A1 | 2/2003 | Mccall |
| 2003/0069752 A1 | 4/2003 | LeDain et al. |
| 2003/0233064 A1 | 12/2003 | Arm et al. |
| 2004/0034484 A1 | 2/2004 | Solomita, Jr. et al. |
| 2004/0137897 A1 | 7/2004 | Teixeira |
| 2004/0203649 A1 | 10/2004 | Cashiola |
| 2005/0027636 A1 | 2/2005 | Gilbert et al. |
| 2005/0152694 A1 | 7/2005 | Chown |
| 2005/0172304 A1 | 8/2005 | Tavares et al. |
| 2005/0194456 A1 | 9/2005 | Tessier et al. |
| 2005/0229220 A1 | 10/2005 | Fisher et al. |
| 2005/0262026 A1 | 11/2005 | Watkins |
| 2007/0005195 A1 | 1/2007 | Pasquale et al. |
| 2007/0055999 A1 | 3/2007 | Radom et al. |
| 2007/0222295 A1 | 9/2007 | Wareham et al. |
| 2008/0011864 A1 | 1/2008 | Tessier et al. |
| 2008/0046715 A1 | 2/2008 | Balazs et al. |
| 2008/0114638 A1 | 5/2008 | Colliau et al. |
| 2008/0167931 A1 | 7/2008 | Gerstemeier et al. |
| 2008/0177678 A1 | 7/2008 | Di Martini et al. |
| 2008/0255760 A1 | 10/2008 | Rojicek et al. |
| 2008/0262848 A1 | 10/2008 | Shienbrood et al. |
| 2009/0046625 A1 | 2/2009 | Diener et al. |
| 2009/0187499 A1 | 7/2009 | Mulder et al. |
| 2009/0198384 A1 | 8/2009 | Ahn |
| 2009/0204458 A1* | 8/2009 | Wiese et al. .................... 705/7 |
| 2009/0204977 A1 | 8/2009 | Tavares et al. |
| 2009/0249090 A1 | 10/2009 | Schmitz et al. |
| 2009/0271255 A1 | 10/2009 | Utter et al. |
| 2009/0281674 A1 | 11/2009 | Taft |
| 2009/0295594 A1 | 12/2009 | Yoon |
| 2009/0297488 A1 | 12/2009 | Fraser et al. |
| 2009/0313083 A1 | 12/2009 | Dillon et al. |
| 2009/0319090 A1 | 12/2009 | Dillon et al. |
| 2010/0057480 A1 | 3/2010 | Arfin et al. |
| 2010/0076615 A1 | 3/2010 | Daniel et al. |
| 2010/0076835 A1 | 3/2010 | Silverman |
| 2010/0106342 A1 | 4/2010 | Ko et al. |
| 2010/0106543 A1 | 4/2010 | Marti |
| 2010/0114340 A1 | 5/2010 | Huizenga et al. |
| 2010/0138363 A1 | 6/2010 | Batterberry et al. |
| 2010/0168924 A1 | 7/2010 | Tessier et al. |
| 2010/0274377 A1 | 10/2010 | Kaufman et al. |
| 2010/0283606 A1 | 11/2010 | Tsypin et al. |
| 2010/0324962 A1 | 12/2010 | Nesler et al. |
| 2011/0016200 A1 | 1/2011 | Koch |
| 2011/0040550 A1 | 2/2011 | Graber et al. |
| 2011/0040666 A1 | 2/2011 | Crabtree et al. |
| 2011/0046805 A1 | 2/2011 | Bedros et al. |
| 2011/0093493 A1 | 4/2011 | Nair et al. |
| 2011/0113068 A1 | 5/2011 | Ouyang |
| 2011/0125542 A1 | 5/2011 | Koch |
| 2011/0172836 A1 | 7/2011 | Boss et al. |
| 2011/0172838 A1 | 7/2011 | Pai et al. |
| 2011/0196539 A1 | 8/2011 | Nair et al. |
| 2011/0196546 A1 | 8/2011 | Muller et al. |
| 2011/0199209 A1 | 8/2011 | Siddaramanna et al. |

(56) References Cited

U.S. PATENT DOCUMENTS

| | | | |
|---|---|---|---|
| 2011/0202910 A1* | 8/2011 | Venkatakrishnan et al. | G06Q 50/06 717/171 |
| 2011/0212700 A1 | 9/2011 | Petite | |
| 2011/0231320 A1 | 9/2011 | Irving | |
| 2011/0258049 A1 | 10/2011 | Ramer et al. | |
| 2011/0301774 A1 | 12/2011 | Koch | |
| 2012/0066397 A1 | 3/2012 | Koch et al. | |
| 2012/0066686 A1 | 3/2012 | Koch | |
| 2012/0084696 A1 | 4/2012 | Marti | |
| 2012/0093141 A1 | 4/2012 | Imes et al. | |
| 2012/0101653 A1 | 4/2012 | Tran | |
| 2012/0109399 A1 | 5/2012 | Tran | |
| 2012/0136915 A1 | 5/2012 | Koch et al. | |
| 2012/0173030 A1 | 7/2012 | Taft | |
| 2012/0197456 A1 | 8/2012 | Walter et al. | |
| 2012/0197457 A1 | 8/2012 | Walter et al. | |
| 2012/0197458 A1 | 8/2012 | Walter et al. | |
| 2012/0245968 A1 | 9/2012 | Beaulieu et al. | |
| 2012/0271473 A1 | 10/2012 | Koch | |
| 2012/0277920 A1 | 11/2012 | Koch | |
| 2013/0035992 A1 | 2/2013 | Silverman | |
| 2013/0047010 A1 | 2/2013 | Massey et al. | |
| 2013/0079931 A1 | 3/2013 | Wanchoo et al. | |
| 2013/0123996 A1 | 5/2013 | Matos | |
| 2013/0144451 A1 | 6/2013 | Kumar et al. | |
| 2013/0254151 A1 | 9/2013 | Mohagheghi et al. | |
| 2014/0122181 A1 | 5/2014 | Fisera et al. | |
| 2014/0149973 A1 | 5/2014 | Walter et al. | |
| 2014/0277769 A1 | 9/2014 | Matsuoka et al. | |
| 2014/0277795 A1 | 9/2014 | Matsuoka et al. | |
| 2014/0278687 A1 | 9/2014 | McConky et al. | |
| 2015/0134280 A1 | 5/2015 | Narayan et al. | |
| 2015/0170171 A1 | 6/2015 | McCurnin et al. | |

FOREIGN PATENT DOCUMENTS

| | | |
|---|---|---|
| WO | WO 2008/027455 | 3/2008 |
| WO | WO 2008/027457 | 3/2008 |
| WO | WO 2009/006133 | 1/2009 |
| WO | WO 2009/020606 | 2/2009 |
| WO | WO 2009/023230 | 2/2009 |
| WO | WO 2009/027617 | 3/2009 |
| WO | WO 2009/085610 | 7/2009 |
| WO | WO 2011/065007 | 6/2011 |
| WO | WO 2013/025565 | 2/2013 |
| WO | WO 2013/055551 | 4/2013 |

OTHER PUBLICATIONS

"Smart Demand Response: A Discussion Paper," Energy Networks Association, energyuk, 44 pages, prior to Nov. 29, 2012.

International Search Report for PCT ApplicationSerial No. pct/us2012/058537, International Filing Date Oct. 3, 2012.

Hunt, "Automated Demand Response System and Advanced End-Use Services Platform," Optimal Technologies, 31, pages, Sep. 24, 2004.

Olson, "New Approaches in Automating and Optimizing Demand Response to Solve Peak Load Management Problems," Building IQ brochure, 8 pages, 2011.

Schisler et al., "The Role of Demand Response in Ancillary Services Markets," IEEE, 3 pages, 2008.

Violette et al., "DRR Valuation and Market Analysis vol. II: Assessing the DRR Benefits and Costs," Summit Blue Consulting, 112 pages, Jan. 6, 2006.

Zaidi et al., "Load Recognition for Automated Demand Response in Microgrids," IEEE, pp. 2436-2439, 2010.

Autogrid, "Austin Energy and AutoGrid Systems Collaborate on Standards-Based Automated Demand Response to Usher in a New Era of Retail Choice for the Demand Response Market," 5 pages, Feb. 26, 2013.

U.S. Appl. No. 13/939,935, filed Jul. 11, 2013.

U.S. Appl. No. 13/940,043, filed Jul. 11, 2013.
U.S. Appl. No. 13/940,066, filed Jul. 11, 2013.
U.S. Appl. No. 13/940,090, filed Jul. 11, 2013.
U.S. Appl. No. 14/056,902, filed Oct. 17, 2013.

Santacana et al., "Getting Smart, With a Clearer Vision of Intelligent Grid, Control Emerges from Chaos," IEEE Power and Energy Magazine, pp. 41-48, Mar./Apr. 2010.

Abdullah et al., "Demand-Side Energy Management Performed Using Direct Feedback via Mobile Systems: Enables Utilities to Deploy Consumer Based Demand Response Programs," 2010 IEEE International Energy Conference and Exhibition, pp. 172-177, 2010.

Coughlin et al., "Estimating Demand Response Load Impacts: Evaluation of Baseline Load Models for Non-Residential Buildings in California," Lawrence Berkeley National Laboratory, Report No. LBNL-63728, 33 pages, Jan. 2008.

European Search Report for Related Application No. EP 12169650.4, Dated Nov. 22, 2012.

U.S. Appl. No. 13/621,195, filed Sep. 15, 2012.

Cruz, "Tutorial on GPU Computing with an Introduction to CUDA," 37 pages, prior to Nov. 17, 2011.

Holmberg, "Facility Interface to the Smart Grid," National Institute of Standards and Technology, 7 pages, printed 2012.

Honeywell, "Automated Demand Response—Southern California Program," 2 pages, printed Aug. 1, 2011.

Honeywell, "The Perfect Response to Peak Events," 4 pages, Nov. 2010.

http://en.wikipedia.org/wiki/Demand_response, "Demand Response," 10 pages, printed Feb. 3, 2012.

https://buildingsolutions.honeywell.com/Cultures/en-US/Markets/Utilities/DemandResponse/, 1page, printed Feb. 3, 2012.

Kiliccote et al., "Findings from Seven Years of Field Performance Data for Automated Demand Response in Commercial Buildings," Lawrence Berkeley National Laboratory, Report No. LBNL-3643E, May 2010.

Kiliccote et al., "Open Automated Demand Response for Small Commercial Buildings," Lawrence Berkeley National Laboratory, Report No. LBNL-2195E, 104 pages, Jul. 2009.

Kiliccote et al., "Open Automated Demand Response Communications in Demand Response for Wholesale Ancillary Services," Lawrence Berkeley National Laboratory, Report No. LBNL-2945E, 13 pages, Nov. 2009.

Koch et al., "Architecture Concepts and Technical Issues for an Open, Interoperable Automated Demand Response Infrastructure," Berkeley National Laboratory, Report No. LBNL-63664, 7 pages, Oct. 2007.

Koch et al., "Direct Versus Facility Centric Load Control for Automated Demand Response," Lawrence Berkeley National Laboratory, Report No. LBNL-2905E, 11 pages, Nov. 2009.

Koch et al., "Scenarios for Consuming Standardized Automated Demand Response Signals," Lawrence Berkeley National Laboratory, Report No. LBNL-1362E, 10 pages, Nov. 2008.

Koch, "The Demand Response Automation Server (DRAS)," Building Performance, http://www.akuacom.com/assets/pdf/ASHRAE_2008_Ed_Koch.pdf, 18 pages, prior to Nov. 17, 2011.

Piette et al., "Automated Critical Peak Pricing Field Tests: 2006 Pilot Program Description and Results," Berkeley National Laboratory, Report No. LBNL-62218, 67 pages, Aug. 2007.

Piette et al., "Automated Critical Peak Pricing Field Tests: Program Description and Results," Lawrence Berkeley National Laboratory, Report No. LBNL-59351, Apr. 2006.

Piette et al., "Design and Implementation of an Open, Interoperable Automated Demand Response Infrastructure," Berkeley National Laboratory, Report No. LBNL-63665, 6 pages, Oct. 2007.

Piette et al., "Findings From the 2004 Fully Automated Demand Response Tests in Large Facilities," Lawrence Berkeley National Laboratory, Report No. LBNL-58178, 197 pages, Sep. 2005.

Piette et al., "Linking Continuous Energy Management and Open Automated Demand Response," Lawrence Berkeley National Laboratory, Report No. LBNL-1361E, 9 pages, Nov. 2008.

Piette et al., "Open Automated Demand Response Communications Specification," Version 1.0, CEC-500-2009-063, 214 pages, Apr. 2009.

(56) References Cited

OTHER PUBLICATIONS

Piette et al., "Participation through Automation: Fully Automated Critical Peak Pricing in Commercial Buildings," Berkeley National Laboratory, Report No. LBNL-60614, 14 pages, Aug. 13-18, 2006.
Watson et al., "Machine to Machine (M2M) Technology in Demand Responsive Commercial Buildings," Berkeley National Laboratory, Report No. LBNL-55087, 18 pages, Aug. 2004.
Yin et al., "Auto-DR and Pre-Cooling of Buildings at Tri-City Corporate Center," Lawrence Berkeley National Laboratory, Report No. LBNL-3348, 140 pages, Nov. 2008.
U.S. Appl. No. 14/526,193, filed Oct. 28, 2014.
U.S. Appl. No. 14/224,744, filed Mar. 25, 2014.
"Executive Summary," 1 page, prior to Sep. 2007.
Federal Energy Regulatory Commission (FERC), "Assessment of Demand Response & Advanced Metering," 92 pages, Sep. 2007.
http://www.akuacom.com/solutions/index.html, "Akuacom—Automated Demand Response," 2 pages, printed Feb. 3, 2012.
http://www.naesb.org/pdf3/dsmee012308213.doc, "Demand Response Measurement and Verification Literature Review," 29 pages, created Jan. 14, 2008, modified Dec. 18, 2012.
Couper, "Optimizing Demand Response to Improve Economic Dispatch and Reliability," downloaded from http://public.dhe.ibm.com/common/ssi/ecm/en/euw03026usen/EUW03026USEN.PDF, 5 pages, prior to Dec. 11, 2013.

* cited by examiner

SYSTEM AND APPROACH TO MANAGE VERSIONING OF FIELD DEVICES IN A MULTI-SITE ENTERPRISE

BACKGROUND

The present disclosure pertains to management of devices and particularly to versioning the devices. More particularly, the disclosure pertains to management and versioning the devices in a multi-site environment.

SUMMARY

The disclosure reveals an energy management and control system that may manage versioning firmware for devices. The system may be structured in a hierarchy of enterprise, site and field levels, with one or more computing platforms at the various levels. An enterprise supervisor may detect and obtain new version firmware for the devices at the field level. The new version firmware may be transferred from the supervisor to one or more site controllers. The one or more site controllers may transfer the new version firmware to eligible field devices. The devices may report to their respective site controllers a status of a transfer of the new version firmware. The site controllers may report to the supervisor the status of the transfer. Detection of new version firmware may be automatic. Transfer of the new version firmware to virtually all of the eligible devices may be automatic.

DESCRIPTION

Figure 1:
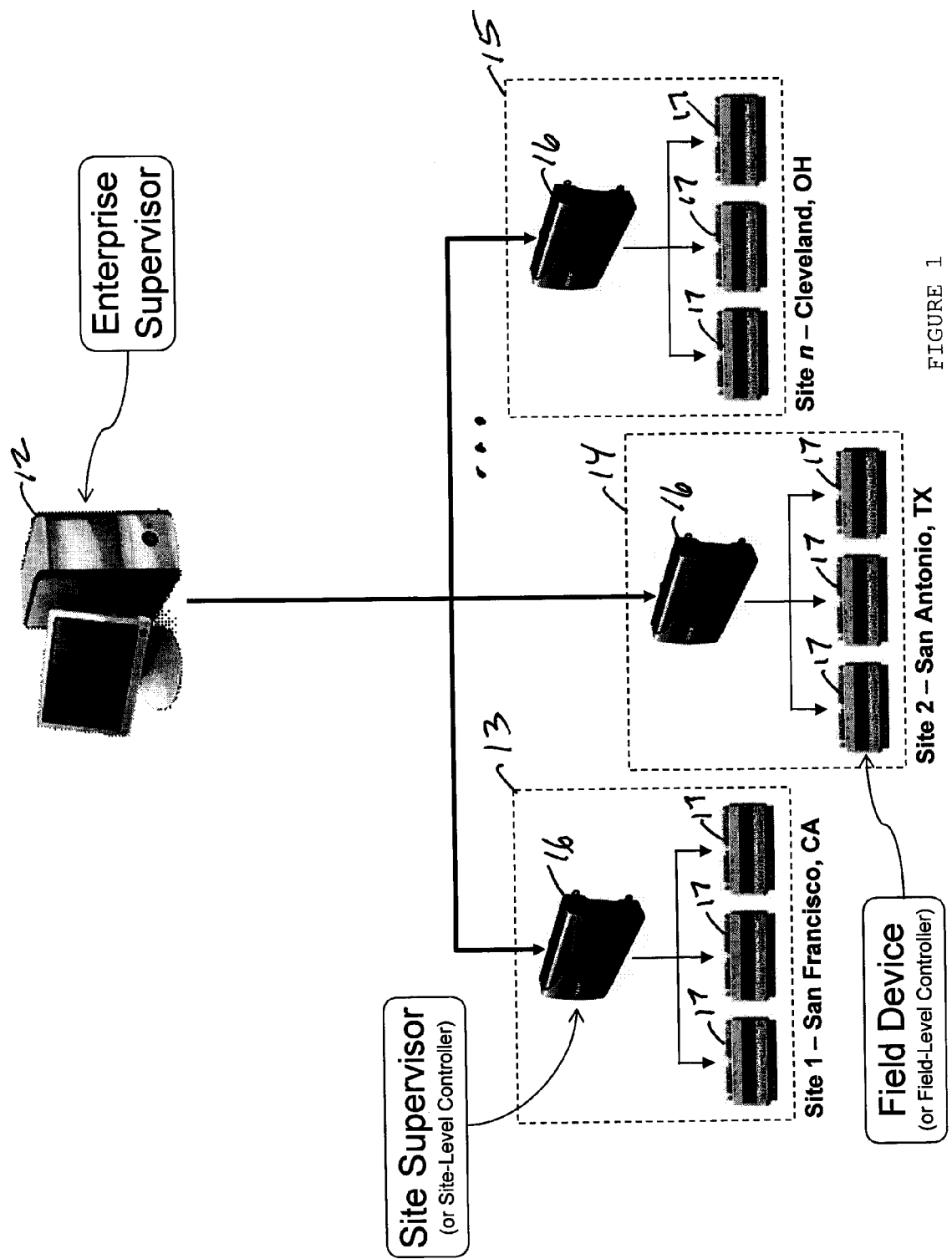
FIG. 1 is a diagram of an energy management and control system hierarchy.

The present system and approach, as described herein and/or shown in the Figures, may incorporate one or more processors, computers, controllers, user interfaces, wireless and/or wire connections, and/or the like, wherever desired.

An energy management and control system (EMCS) may be a three-tier hierarchy with enterprise, site and field levels. Computing platforms (computers/controllers) at each level may execute applications specific to the functionality required at that level.

At the field level, the EMCS may consist of numerous devices, each of which performs a specific function. These devices might be, for example, simple input/output modules (IOMs), electronic thermostats (ETMs) that control rooftop heating, ventilation and air conditioning (HVAC) units, lighting control units (LCUs) that manage a building's interior and exterior lights, and/or other kinds of devices. Additionally, each controller type may be comprised of various models; ETM-1, ETM-2 and ETM-3 might be models of ETMs that are differentiated by unique features and/or functions.

Each field device in an EMCS may contain a program (or firmware) which controls that device's functionality. Virtually all controllers of a particular model, ETM-1s for example, may execute the same version of firmware. As new features and functions are developed, or as bugs are fixed, new firmware versions may be transferred to each controller. Placing another version of firmware in place of firmware in a controller or that of a field device may be regarded as "versioning".

In the related art, field device versioning may be a manual process. One may manually connect to each site and initiate a firmware update for each field device needing a new version. When a particular model of controller needs to have its firmware updated, the effort of versioning may be complex, costly and time-consuming.

Depending on a building's size, an EMCS might consist of a few or several dozen controllers. While a small footprint building may have only ten ETMs, and a few IOMs and LCUs, a larger building may have thirty ETMs, and a dozen IOMs and LCUs.

As the scale of a multi-site enterprise increases, the number of controllers that should be managed may greatly increase. A single site may have only ten to thirty ETM-1 controllers; however, an enterprise with hundreds of sites may need to manage thousands of ETM-1s. If the enterprise has over a thousand sites, the controller count may be in the tens of thousands.

The present system and approach may manage the task of deploying firmware versions to controllers in a multi-site enterprise. The issues of time, cost and complexity may be addressed by distributing and automating the tasks associated with version management across the enterprise hierarchy.

The tasks, or responsibilities, at the various levels of the hierarchy may be noted in the following. The enterprise supervisor, controller or computer (enterprise) may provide a versioning service which manages the field device versioning process. It may provide a user interface for the versioning service which allows a user to configure, manage and monitor the versioning process. It may provide a query mechanism to determine the field device inventory of each site. The enterprise may have a capability to automatically detect when a firmware file containing a new version of the program for a particular model of field device is placed on the enterprise and may initiate the file transfer process. The enterprise may transfer a firmware file to each site at which at least one compatible device model is installed. The enterprise may receive updates from each site about the progress/status of the transfer process.

The site controller may respond to an enterprise query for the site controller's field device inventory. The site controller may receive a firmware file from the enterprise. The site controller may automatically initiate and manage the process of transferring a firmware file to each compatible field device. The site controller may report the progress/status of the transfer process to the enterprise.

The field device may receive a firmware file from the site controller. The field device may report the progress/status of the transfer process to the site controller.

The enterprise level may be a centralized application which manages and monitors the control system at multiple, remote sites. A site may have one or more site controllers which manage, control, and monitor one or more networks of field devices. The field device may typically be designed to control a piece of EMCS equipment. Other uses may include control of indoor and outdoor lights, control of signage, and more.

The present system and approach may have enhanced functionality at each level of the EMCS. The enterprise may have a versioning service added to an enterprise application. This service may coordinate virtually all activities related to versioning of field devices. The service may provide a user interface which allows the user to configure the service's behavior and monitor versioning activities. A query mechanism may interrogate each site in the enterprise to obtain a field device inventory from each site controller. This inventory may then be available to the user interface allowing the user to view and manage the installed base of field devices. The user may modify versioning behavior at the enterprise, site, site controller, or field device level; for instance, enabling the services ability to automatically detect the presence of a new firmware file and initiate the file transfer process, enabling or disabling the automatic firmware upgrade functionality of one or more specific sites, site controllers, and/or field device types.

A firmware file (firmware) may be saved to a specific subdirectory on the computer's file system. Based on the configuration of the versioning service, the enterprise application may monitor that subdirectory for the presence of a new file. When a new file is detected, the enterprise application may initiate the file transfer process. Alternately, the file transfer process may be initiated manually through the application's user interface.

The firmware file may be parsed to determine the target field device model. Each site in the enterprise may then be scanned, depending on the site-specific configuration, to locate sites at which the particular field device is installed. When a qualifying site is found, the firmware file may be transferred to the appropriate site controller. This transfer process may begin with the enterprise application notifying the site controller with a "start of file transfer" message. Once the site controller acknowledges the message, the enterprise application may transfer the file according to the enterprise-to-site communications protocol.

The enterprise application may execute a monitoring process which receives progress/status updates from the site controllers as the firmware file is being received and the field devices are being updated. The monitoring process may maintain a user interface which displays the current progress and/or status of the firmware upgrade activities.

In conjunction with the field device inventory, the versioning service may maintain a history of upgrade activity for each field device. When the site controller receives a "start of file transfer" message from the enterprise application, the site controller may prepare a location on its local file store (or comparable storage medium) to save the incoming file. The site controller may receive the file according to an enterprise-to-site communications protocol and save the file. As the file is received, the site controller may update the enterprise application with progress and/or status information.

At the end of the file transfer, the site controller may parse the firmware file to determine the target field device model. The site controller may then scan its device network or networks to locate compatible field devices. When a qualifying field device is found, the site controller may flag that device as needing a firmware upgrade.

The site controller may use a polling mechanism to schedule communications with its one or more networks of field devices. As each device gets a turn, the polling task may check if the device has been flagged for a firmware upgrade. Following the site controller-to-field device communications protocol, the firmware file may be transmitted to the field device. During the upgrade process, the site controller may receive progress and/or status updates from the field device and communicate those updates to the enterprise application.

When a field device receives a "start of firmware upgrade" message from the site controller, the device may prepare, according to its device specification, for a firmware upgrade. The device may receive and process the new program according to its device specification; these details may incorporate where and/or how the new version is saved during the upgrade and the mechanism for replacing the current application with the new version. As the firmware upgrade process occurs, the device may update the site controller with progress/status information.

FIG. 1 is a diagram of the energy management and control system hierarchy with example sites. An enterprise supervisor 12 may be connected with a number (n) of sites 13, 14 and 15. Although three sites are shown, there may be more or fewer sites. Site 13 may have one or more site-level controllers or site supervisors 16, connected with enterprise supervisor 12, and one or more field devices 17 connected with a site controller 16. As examples, site 13, 14, and 15 may be in San Francisco, San Antonio and Cleveland, respectively. Sites 14 and 15 may have the same structure and items as site 13.

Figure 2:
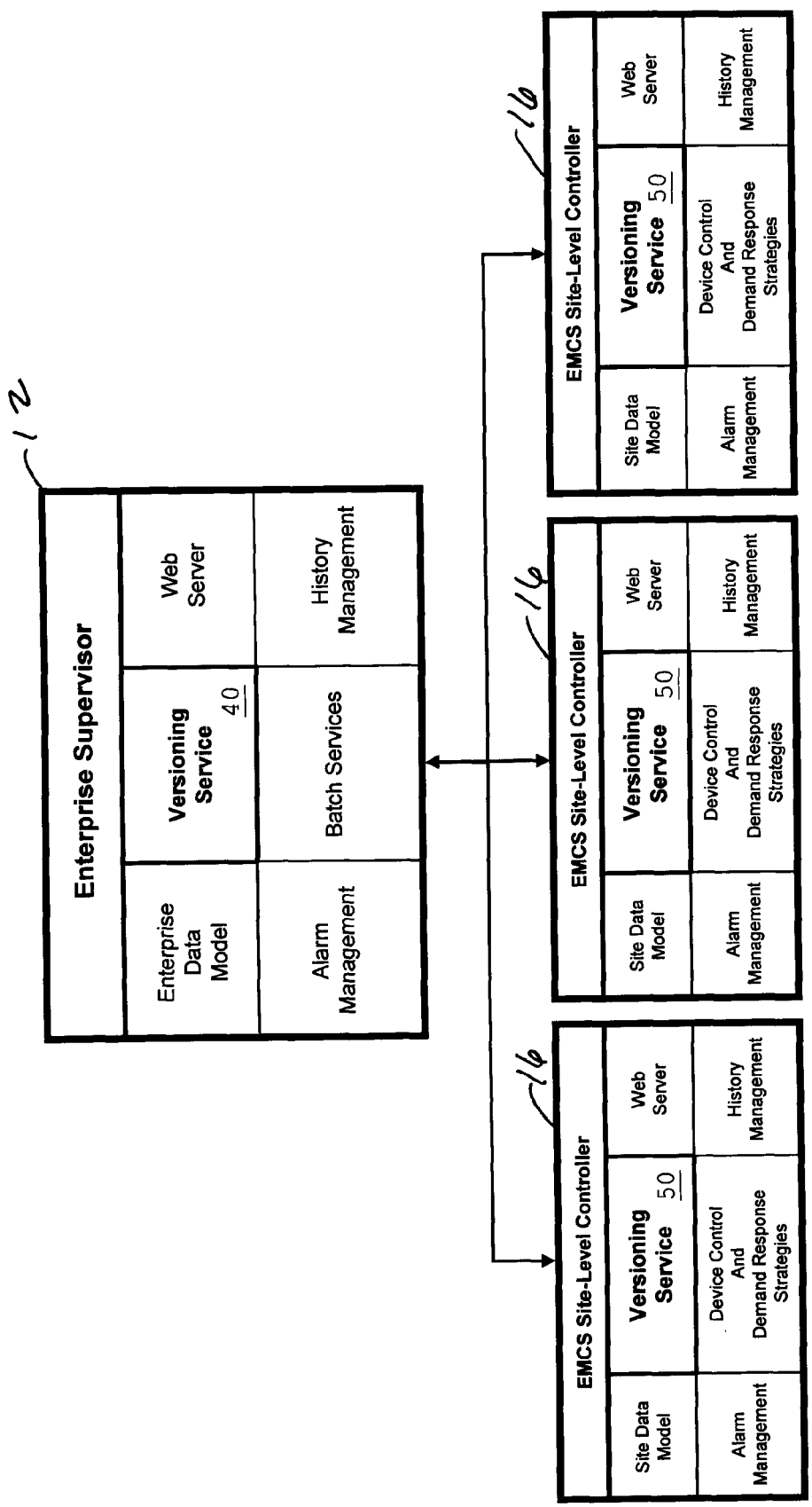
FIG. 2 is a diagram of a relationship between an enterprise supervisor and site-level controllers.

FIG. 2 is a block diagram of enterprise supervisor 12 and its site-level controllers 16. The blocks within the block representing enterprise supervisor 12 may indicate a versioning service 40, an enterprise data model, a web server, alarm management, history management and batch services. There may be additional blocks indicating other items relative to enterprise supervisor 12.

A block representing each site level controller 16 may contain blocks indicating a versioning service 50, site data model, a web server, alarm management, history management, and device control and demand response strategies. There may be additional blocks indicating other items relative to site level controller 16.

Figure 3:
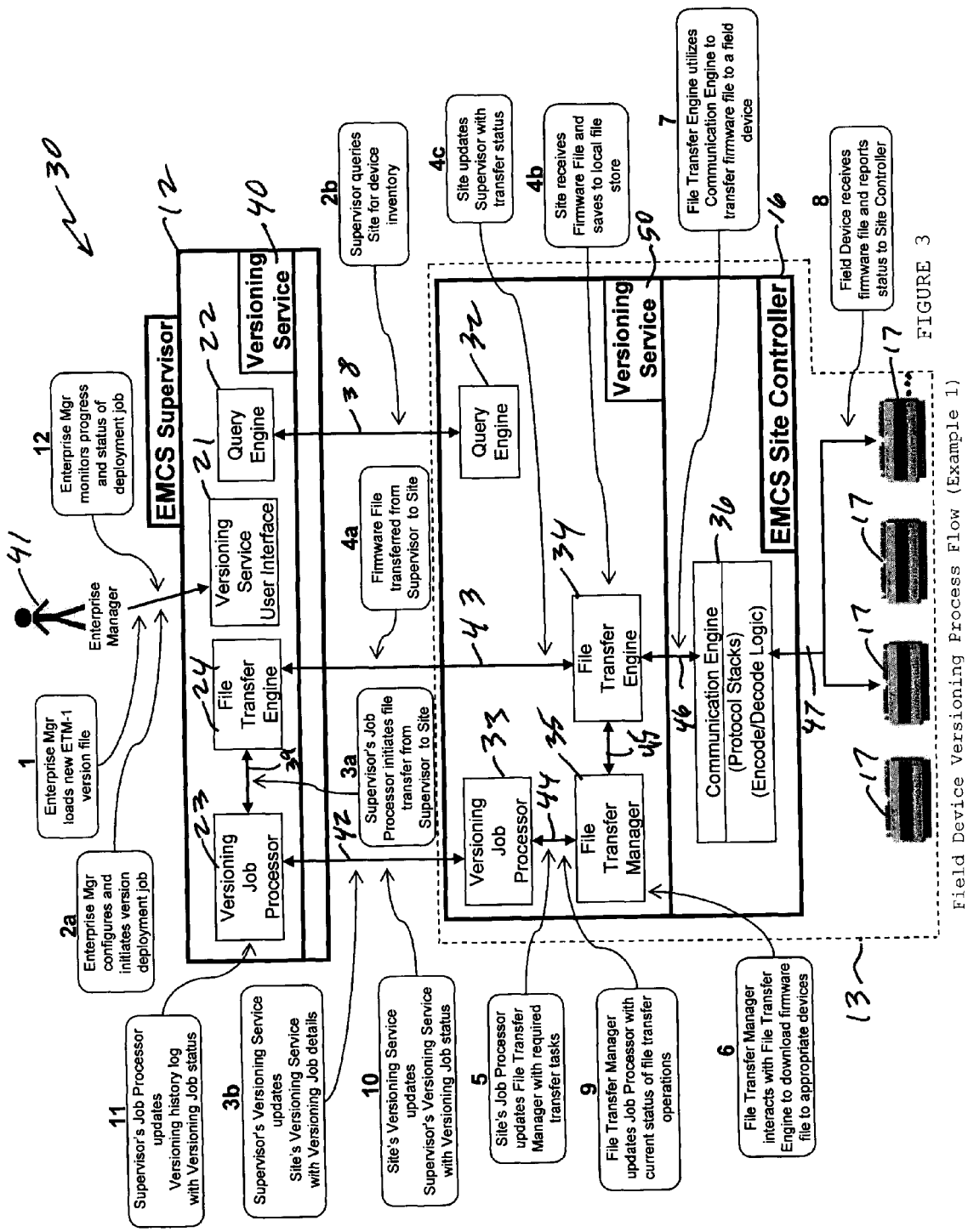
FIG. 3 is a diagram of a field device versioning process flow.

FIG. 3 is a diagram 30 representing an example of a field device versioning process flow along with components of the energy management and control system. Enterprise supervisor 12 and site controller 16 may incorporate a versioning service 40 and 50, respectively. Components of versioning service 40 of supervisor 12 may incorporate a versioning service user interface 21, a query engine 22, a versioning job processor 23 and a file transfer engine 24.

Components of versioning service 50 of site controller 16 may incorporate a query engine 32, a versioning job processor 33, a file transfer engine 34 and a file transfer manager 35. Site controller 16 may also incorporate a communication engine 36.

An enterprise manager 41 may provide direction and information to user interface 21. For instance, manager 41 may load a new version firmware file via a user interface. The firmware is an example file. Another file or information may be loaded. Manager 41 may configure and initiate a version deployment job. Supervisor 12 may query a site 13, 14 or 15 for a device 17 inventory. For illustrative purposes, site 13 may be considered as an example. The query may be via a connection 38 between query engines 22 and 32. Versioning job processor 23 of supervisor 12 may initiate a firmware file transfer from supervisor 12 to site 13 via a connection 39 between job processor 23 and file transfer engine 24. Versioning service 40 of supervisor 12 may update the versioning service 50 of site 13 with versioning job details along a connection 42 between versioning job processor 23 of supervisor 12 and versioning job processor 33 of site controller 16. The firmware file may be transferred from supervisor 12 to site 13 via a connection 43 between file transfer engine 24 and file transfer engine 34. Site 13 may receive the firmware file at file transfer engine 34 and save the firmware file to a local file store. Site 13 may update supervisor 12 with firmware file transfer status via connection 43.

Versioning job processor 33 at site 13 may update file transfer manager 35 with needed transfer tasks via a connection 44 between versioning job processor 33 and file transfer manager 35. File transfer manager 35 may interact with file transfer engine 34 via a connection 45 to download the firmware file to the appropriate devices 17 via a connection 47 from a communication engine 36. Communication engine 36 may incorporate protocol stacks, encode/decode logic, and so forth. The one or more field devices 17 may receive the firmware file and report a status to site controller 16 via connection 47 between communication engine 36 and the one or more field devices 17.

File transfer manager 35 may update versioning job processor 33 of site 13 via connection 44 with a current status of the firmware file transfer operations. Versioning service 50 of site 13 may update versioning service 40 of supervisor 12 with a versioning job status via connection 42 between versioning job processor 33 and versioning job processor 23. Job processor 23 of supervisor 12 may update a versioning history log with the versioning job status. Enterprise manager 41 may monitor progress and status of the deployment job of the firmware file via the versioning service user interface 21 of supervisor 12.

Figure 4:
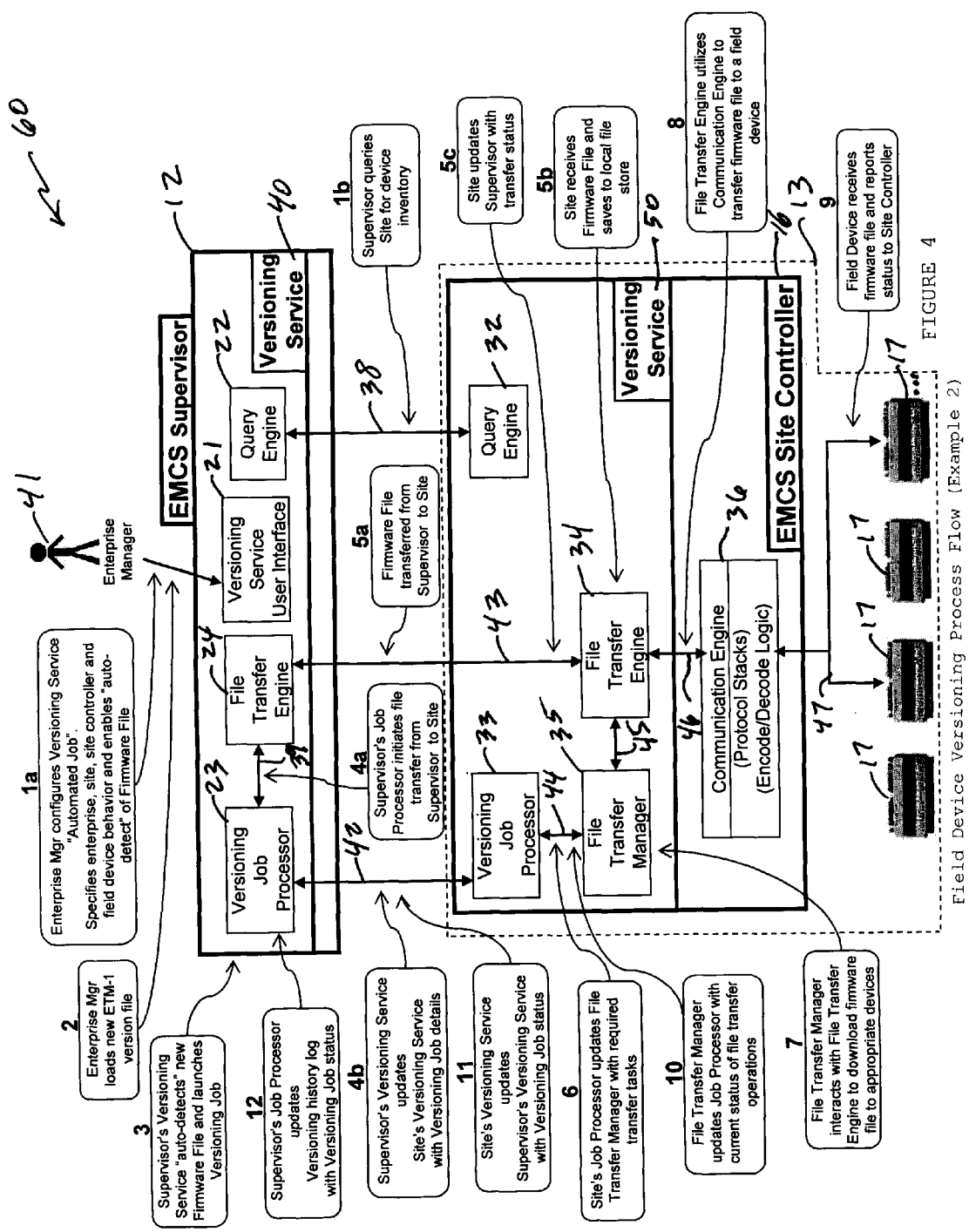
FIG. 4 is a diagram of another field device versioning process flow.

FIG. 4 is a diagram 60 representing another example of a field device versioning process flow along with components of the energy management and control system. Diagram 60 may differ from diagram 30 of FIG. 3 relative to a flow process. The components may be similar or the same among the diagrams. To start, enterprise manager 41 may configure an "automated job" of versioning service 40 of supervisor 12 via user interface 21. Manager 41 may specify the enterprise, site, site controller and field device behavior also via interface 21. Manager 41 may enable an "auto-detect" of a firmware file. Supervisor 12 may query site 13 for a field device 17 inventory via query engines 22 and 32 with connection 38. Manager 41 may load a new version firmware file via interface 21. Versioning service 40 of supervisor 12 may auto-detect a new firmware file and launch a versioning job. From here on, the flow process and structure of diagram 60 may appear similar to that of diagram 30.

To recap, an energy management and control system may incorporate a supervisor controller having a first versioning service component, one or more site controllers, having a second versioning service component, connected to the supervisor controller, and one or more field devices, having firmware, connected to the one or more site controllers. The first versioning service component may have a configuration that enables automatic detection by the supervisor controller of new version firmware. A query may be made by the first versioning service component to the second versioning service component for an inventory of the one or more field devices to determine which field devices, if any, are appropriate for receipt of the new version firmware. The first versioning service component may launch a versioning job process and transfer the new version firmware to the second versioning service component to continue the versioning job process. The versioning job process may incorporate installing the new version firmware in the one or more field devices determined as appropriate for receipt of the new version firmware.

The first versioning component may incorporate a user interface. A user may provide, via the user interface, the configuration to the first versioning service component that enables automatic detection by the supervisor controller of the new version firmware.

A field device appropriate for receipt of the new version firmware may have a present version firmware which is upgradeable or replaceable with the new version firmware. The field device, appropriate for receipt of the new version firmware, may report to a site controller a status of a transfer of the new version firmware.

A site controller may report a status of transfer operations of the new version firmware to the first versioning service component so that a user can monitor the status and progress of the transfer operations via the user interface.

When the first versioning service component launches the versioning job process and transfers the new version firmware to the second versioning service component to continue the versioning job process, the job process may automatically continue until virtually all of the one or more field devices determined as appropriate for receipt of the new version firmware, have been installed with the new version firmware unless interrupted by a user via a user interface to the system.

An energy management and control system having a mechanism for versioning firmware of field devices, may incorporate an enterprise supervisor, one or more site controllers connected to the enterprise supervisor, and one or more field devices connected to the one or more site controllers. The one or more field devices may incorporate firmware that controls an operation of the one or more field devices, respectively.

The enterprise supervisor may detect new version firmware for one or more field devices. The enterprise supervisor may query the one or more site controllers for an inventory of appropriate field devices qualified to receive the new version firmware. Upon a launch initiated by a user, the enterprise supervisor may transfer the new version firmware to the one or more site controllers. The new version firmware may be transferred by the one or more site controllers to virtually all of the appropriate field devices. A transfer of the new version firmware may replace or upgrade the firmware in the appropriate field devices.

The enterprise supervisor may incorporate a versioning service that detects the new version firmware. The versioning service may provide information about receipt and transfer of new version software to a versioning history log.

The one or more site controllers may update the enterprise supervisor with a status of a transfer of the new version firmware.

Upon transfer the new version firmware to the one or more site controllers, the new version firmware may then be automatically transferred to the appropriate field devices.

An energy management and control system may incorporate a supervisor having a first versioning service component, at least one site controller, connected to the supervisor, having a second versioning service component, and one or more field devices connected to the at least one site controller.

The first versioning service component may be loaded with new version firmware. The new version firmware may be transferred by the first versioning service component to the second versioning service component. The second versioning service component may transfer the new version firmware to replace or upgrade firmware in the one or more field devices.

The first versioning service component may incorporate a user interface, a first query engine, a first file transfer engine, and a first versioning job processor connected to the first file transfer engine.

The second versioning service component may incorporate a second query engine connected to the first query engine, a second file transfer engine connected to the first file transfer engine, a second versioning job processor connected to the first versioning job processor, and a file transfer manager connected to the second versioning job processor and the second file transfer engine.

The second file transfer engine may receive the new version firmware and save the new version firmware to a file store. The file transfer manager may download the new version firmware from the second file transfer engine and/or the file store, and download the new version firmware to an appropriate field device or field devices of the one or more field devices. The second versioning job processor may update the file transfer manager about transfer tasks.

The second query engine may respond to one or more queries from the first query engine regarding an inventory of the one or more field devices to determine the appropriate field device or field devices. An appropriate field device may be a device that has a present version firmware that is replaceable or upgradeable with the new version firmware.

The file transfer manager may further update the second versioning job processor with a current status of transfer operations of the new version firmware to the appropriate field device or field devices.

The site controller may incorporate a communication engine that receives the new version firmware from the second transfer engine and transfers the new version firmware to the appropriate field device or field devices. The one or more field devices may report a new version firmware status to the site controller via the communication engine.

The one or more field devices may incorporate input/output modules, electronic thermostats, and/or lighting control units. The one or more field devices may incorporate one or more model types. Firmware for one model type may be different than firmware for another model type. The new version firmware may be an acceptable version for firmware of just one model type of field devices.

A user interface may permit a user to load the new version firmware, configure and initiate a deployment job for the new version firmware, and monitor the deployment job. The first versioning job processor may initiate a transfer of the new version firmware from the supervisor to the at least one site controller, and update a history log of a versioning job status.

In the present specification, some of the matter may be of a hypothetical or prophetic nature although stated in another manner or tense.

Although the present system and/or approach has been described with respect to at least one illustrative example, many variations and modifications will become apparent to those skilled in the art upon reading the specification. It is therefore the intention that the appended claims be interpreted as broadly as possible in view of the related art to include all such variations and modifications.

What is claimed is:

1. An energy management and control system comprising:
   a supervisor controller having a first versioning service component;
   one or more site controllers, having a second versioning service component, connected to the supervisor controller; and
   one or more field devices, having firmware, connected to the one or more site controllers; and
   wherein:
   the first versioning service component has a configuration that enables automatic detection by the supervisor controller of new version firmware for the one or more field devices;
   a query is made by the first versioning service component to the second versioning service component for an inventory of the one or more field devices to determine which field devices, if any, are appropriate for receipt of the new version firmware;
   the first versioning service component launches a versioning job process and transfers the new version firmware to the second versioning service component to continue the versioning job process; and
   the versioning job process comprises installing the new version firmware in the one or more field devices determined as appropriate for receipt of the new version firmware.

2. The system of claim 1, wherein:
   the first versioning component comprises a user interface; and
   a user provides, via the user interface, the configuration to the first versioning service component that enables automatic detection by the supervisor controller of the new version firmware.

3. The system of claim 1, wherein a field device appropriate for receipt of the new version firmware has a present version firmware which is upgradeable or replaceable with the new version firmware.

4. The system of claim 3, wherein the field device, appropriate for receipt of the new version firmware, reports to a site controller a status of a transfer of the new version firmware.

5. The system of claim 2, wherein a site controller reports a status of transfer operations of the new version firmware to the first versioning service component so that a user can monitor the status and progress of the transfer operations via the user interface.

6. The system of claim 1, wherein when the first versioning service component launches the versioning job process and transfers the new version firmware to the second versioning service component to continue the versioning job process, the job process automatically continues until virtually all of the one or more field devices determined as appropriate for receipt of the new version firmware, have been installed with the new version firmware unless interrupted by a user via a user interface to the system.

7. An energy management and control system having a mechanism for versioning firmware of field devices, comprising:
   an enterprise supervisor;
   one or more site controllers connected to the enterprise supervisor; and
   one or more field devices connected to the one or more site controllers; and
   wherein:
   the one or more field devices comprise firmware that controls an operation of the one or more field devices, respectively;
   the enterprise supervisor detects new version firmware for one or more field devices;
   the enterprise supervisor queries the one or more site controllers for an inventory of appropriate field devices qualified to receive the new version firmware;
   upon a launch initiated by a user, the enterprise supervisor transfers the new version firmware to the one or more site controllers;
   the new version firmware is transferred by the one or more site controllers to virtually all of the appropriate field devices; and
   a transfer of the new version firmware replaces or upgrades the firmware in the appropriate field devices.

8. The system of claim 7, wherein the enterprise supervisor comprises a versioning service that detects the new version firmware.

9. The system of claim 7, wherein the one or more site controllers update the enterprise supervisor with a status of a transfer of the new version firmware.

10. The system of claim 7, wherein upon transfer the new version firmware to the one or more site controllers, the new version firmware is then automatically transferred to the appropriate field devices.

11. The system of claim 8, wherein the versioning service provides information about receipt and transfer of new version software to a versioning history log.

12. An energy management and control system comprising:
   a supervisor having a first versioning service component;
   at least one site controller, connected to the supervisor, having a second versioning service component; and
   one or more field devices connected to the at least one site controller; and
   wherein:
   the first versioning service component is loaded with new version firmware;
   the new version firmware is transferred by the first versioning service component to the second versioning service component; and
   the second versioning service component transfers the new version firmware to replace or upgrade firmware in the one or more field devices.

13. The system of claim 12, wherein the first versioning service component comprises:
   a user interface;
   a first query engine;
   a first file transfer engine; and
   a first versioning job processor connected to the first file transfer engine.

14. The system of claim 13, wherein the second versioning service component comprises:
   a second query engine connected to the first query engine;
   a second file transfer engine connected to the first file transfer engine;
   a second versioning job processor connected to the first versioning job processor; and
   a file transfer manager connected to the second versioning job processor and the second file transfer engine.

15. The system of claim 14, wherein:
   the second file transfer engine receives the new version firmware and saves the new version firmware to a file store;
   the file transfer manager downloads the new version firmware from the second file transfer engine and/or the file store, and downloads the new version firmware to an appropriate field device or field devices of the one or more field devices;
   the second versioning job processor updates the file transfer manager about transfer tasks;
   the second query engine responds to one or more queries from the first query engine regarding an inventory of the one or more field devices to determine the appropriate field device or field devices; and
   an appropriate field device is a device that has a present version firmware that is replaceable or upgradeable with the new version firmware.

16. The system of claim 15, wherein the file transfer manager further updates the second versioning job processor with a current status of transfer operations of the new version firmware to the appropriate field device or field devices.

17. The system of claim 15, wherein the site controller comprises a communication engine that receives the new version firmware from the second transfer engine and transfers the new version firmware to the appropriate field device or field devices.

18. The system of claim 17, wherein the one or more field devices report a new version firmware status to the site controller via the communication engine.

19. The system of claim 12, wherein:
   the one or more field devices comprise input/output modules, electronic thermostats, and/or lighting control units;
   the one or more field devices comprise one or more model types;
   firmware for one model type can be different than firmware for another model type; and
   the new version firmware can be an acceptable version for firmware of just one model type of field devices.

20. The system of claim 13, wherein:
   a user interface permits a user to load the new version firmware, configure and initiate a deployment job for the new version firmware, and monitor the deployment job; and/or
   the first versioning job processor initiates a transfer of the new version firmware from the supervisor to the at least one site controller, and updates a history log of a versioning job status.

* * * * *